United States Patent
Blume et al.

(10) Patent No.: US 12,155,195 B2
(45) Date of Patent: Nov. 26, 2024

(54) VOLTAGE CONVERTER HAVING OVERVOLTAGE PROTECTION

(71) Applicant: B&R INDUSTRIAL AUTOMATION GMBH, Eggelsberg (AT)

(72) Inventors: Sebastian Blume, Eggelsberg (AT); Thomas Schiemer, Eggelsberg (AT); Tim Huber, Eggelsberg (AT); Djordje Vukovic, Eggelsberg (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 0 days.

(21) Appl. No.: 18/016,204

(22) PCT Filed: Jul. 15, 2021

(86) PCT No.: PCT/EP2021/069783
§ 371 (c)(1),
(2) Date: Jan. 13, 2023

(87) PCT Pub. No.: WO2022/013367
PCT Pub. Date: Jan. 20, 2022

(65) Prior Publication Data
US 2023/0275420 A1    Aug. 31, 2023

(30) Foreign Application Priority Data
Jul. 16, 2020 (AT) .............. A 50619/2020

(51) Int. Cl.
*H02H 3/20* (2006.01)
*H02H 3/05* (2006.01)
*H02H 7/12* (2006.01)

(52) U.S. Cl.
CPC .............. *H02H 3/202* (2013.01); *H02H 3/05* (2013.01); *H02H 7/1203* (2013.01)

(58) Field of Classification Search
CPC ............ H02H 1/04; H02H 3/027; H02H 3/05; H02H 3/202; H02H 7/12; H02H 7/1203;
(Continued)

(56) References Cited

U.S. PATENT DOCUMENTS

| 3,809,999 A | 5/1974 | Smith | |
| 4,218,647 A * | 8/1980 | Haas | H02H 9/02 361/18 |

(Continued)

FOREIGN PATENT DOCUMENTS

| CN | 102005940 | 4/2011 |
| EP | 1253704 | 4/2002 |

(Continued)

OTHER PUBLICATIONS

Machine translation of EP 3288181 A1. Obtained from USPTO internal databases on Mar. 18, 2024. (Year: 2018).*

(Continued)

*Primary Examiner* — Fred E Finch, III
(74) *Attorney, Agent, or Firm* — GREENBLUM & BERNSTEIN, P.L.C.

(57) ABSTRACT

To provide improved overvoltage protection for a voltage converter for converting an input voltage into a DC output voltage, a first switch-off unit is provided, which is configured to effect a switch-off of at least a part of the voltage converter if the DC output voltage reaches or exceeds a first voltage threshold, in order to reduce the DC output voltage. Furthermore, a second switch-off unit is provided, which is configured to check whether a mean value of the DC output voltage reaches or exceeds a mean value threshold and, if the mean value threshold is reached or exceeded, to effect a switch-off of at least a part of the voltage converter in order to reduce the DC output voltage.

16 Claims, 3 Drawing Sheets

Figure 1A:
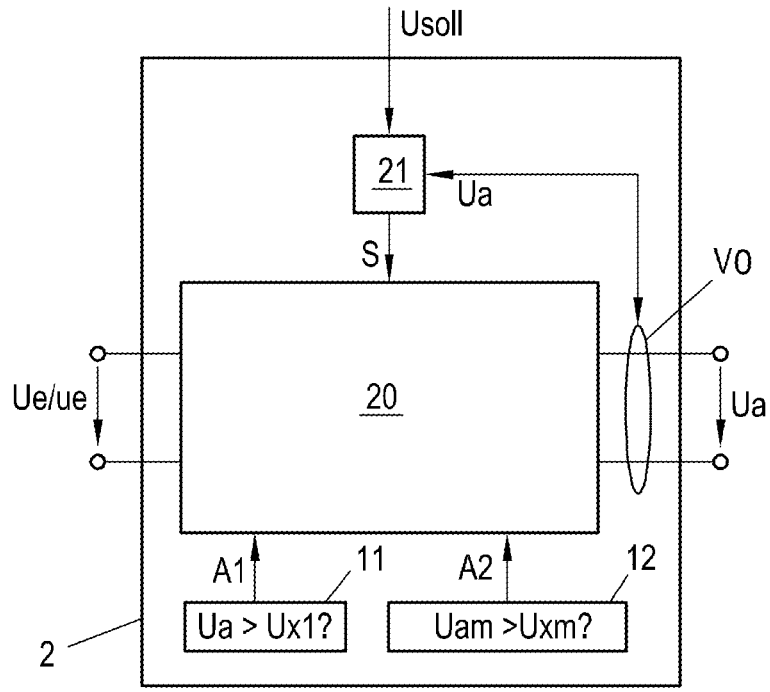

(58) Field of Classification Search
CPC ......... H02H 7/1213; H02H 7/122–127; G01R 19/003; G01R 19/02; G01R 19/16538; H02M 1/32
See application file for complete search history.

(56) References Cited

U.S. PATENT DOCUMENTS

| | | | | |
|---|---|---|---|---|
| 5,943,246 | A * | 8/1999 | Porter | H02H 3/207 307/64 |
| 8,159,205 | B1 | 4/2012 | Latham, II et al. | |
| 9,473,028 | B1 | 10/2016 | Hoyt | |
| 2001/0052814 | A1 | 12/2001 | Takita | |
| 2003/0030955 | A1 | 2/2003 | Yamamura et al. | |
| 2008/0238488 | A1* | 10/2008 | Comisky | G01R 31/40 327/20 |
| 2011/0122664 | A1* | 5/2011 | Yabuzaki | H02M 1/32 363/53 |
| 2013/0308360 | A1 | 11/2013 | Koiwai et al. | |
| 2014/0119059 | A1* | 5/2014 | Mao | H02M 3/33507 363/16 |
| 2014/0218827 | A1* | 8/2014 | Inukai | G06F 1/26 361/18 |
| 2016/0134197 | A1* | 5/2016 | Mao | H02M 3/335 363/21.13 |
| 2016/0280080 | A1* | 9/2016 | Takei | H02M 1/4208 |
| 2016/0322897 | A1* | 11/2016 | Hoyt | H02M 3/158 |
| 2017/0290108 | A1* | 10/2017 | Li | H02H 1/0007 |
| 2018/0062516 | A1 | 3/2018 | Ihs et al. | |
| 2018/0205320 | A1 | 7/2018 | Galloway | |
| 2018/0367027 | A1* | 12/2018 | Chen | H02M 1/32 |
| 2020/0412275 | A1* | 12/2020 | Virta | H02M 7/53871 |

FOREIGN PATENT DOCUMENTS

| | | |
|---|---|---|
| EP | 2 482 615 | 8/2012 |
| EP | 2 672 620 | 12/2013 |
| EP | 3 089 339 | 11/2016 |
| EP | 3 288 181 | 2/2018 |
| JP | 2000-341957 | 12/2000 |
| JP | 2002-135967 | 5/2002 |

OTHER PUBLICATIONS

Int'l Search Report (Form PCT/ISA/210) conducted in Int'l Appln. No. PCT/EP2021/069783 (Oct. 19, 2021).

Int'l Written Opinion (Form PCT/ISA/237) conducted in Int'l Appln. No. PCT/EP2021/069783 (Oct. 19, 2021).

Int'l Prelim. Exam. Report (Form PCT/IPEA/409) conducted in Int'l Appln. No. PCT/EP2021/069783 (Oct. 19, 2021).

Austria Search Report conducted in counterpart Austria Appln. No. A 50619/2020 (Jul. 16, 2020).

Europe Search Report/Office Action conducted in counterpart Europe Appln. No. 21 745 971.8 (Feb. 29, 2024).

* cited by examiner

VOLTAGE CONVERTER HAVING OVERVOLTAGE PROTECTION

The present invention relates to a voltage converter for converting an input voltage into a DC output voltage, comprising a first switch-off unit that is configured to effect a switch-off of at least a part of the voltage converter if the DC output voltage reaches or exceeds a first voltage threshold, in order to reduce the DC output voltage. Furthermore, the present invention relates to a method for monitoring a DC output voltage of a voltage converter, wherein a first voltage threshold is provided and wherein, if the DC output voltage exceeds or reaches the first voltage threshold, at least a part of the voltage converter is switched off in order to reduce the DC output voltage.

In electrical systems, such as long-stator linear motors or planar motors, actuators are supplied with a DC output voltage by a voltage converter. For this purpose, the DC output voltage is converted from a (usually higher) input voltage using a suitable voltage converter. If a DC input voltage is converted into a DC output voltage, a DC-DC converter is provided as a voltage converter. If an AC input voltage is converted into a DC output voltage, a rectifier is provided as a voltage converter. It may also be provided that a rectifier first converts a mains AC voltage into a low DC voltage and that the low DC voltage is then converted into an extra-low DC voltage via a converter stage of the rectifier or a separately provided DC-DC converter.

The DC output voltage has a particular voltage range, e.g., an extra-low voltage range and/or a low voltage range. The respective voltage range has an upper voltage limit, which must not be exceeded by the DC output voltage. In order to increase the efficiency of voltage converters providing a DC output voltage, current heat losses can be minimized. This may take place by keeping the DC output voltage as close as possible to an upper voltage limit of the associated voltage range. In order to nevertheless ensure that the DC output voltage does not exceed the voltage limit, it is necessary to monitor the DC output voltage with high precision. For this purpose, a protection circuit can be provided for monitoring a voltage threshold, wherein the voltage threshold is in the range of the voltage limit of the voltage range.

If the voltage threshold is exceeded, it is ensured that at least a part of the voltage converter is switched off in order to reduce the DC output voltage and to thus keep the exceeding of the voltage threshold as short as possible. However, this means that a switch-off also takes place in the event of any short-time exceeding, such as those that occur during dynamic load changes, even though such short-time exceeding is not to be classified as critical.

It is an object of the present invention to specify improved overvoltage protection of a voltage converter.

This object is achieved by providing a second switch-off unit that is configured to check whether a mean value of the DC output voltage reaches or exceeds a mean value threshold and, if the mean value threshold is reached or exceeded, to effect a switch-off of at least a part of the voltage converter in order to reduce the DC output voltage.

Furthermore, the object is achieved by a method with which a check is made whether a mean value of the DC output voltage reaches or exceeds a mean value threshold, and with which, if the mean value threshold is reached or exceeded, at least a part of the voltage converter is switched off in order to reduce the DC output voltage.

A root mean square value (also called RMS) is preferably considered as the mean value. An arithmetic mean value may, for example, also be considered as the mean value.

By additionally monitoring the mean value of the DC output voltage, the first voltage threshold can be provided as close as possible below the upper voltage limit, thus minimizing current heat losses of the voltage converter and increasing the efficiency of the voltage converter. In the case of briefly occurring peaks of the DC output voltage, the mean value of the DC output voltage is increased only slightly and the mean value threshold is not exceeded. This means that there is no switch-off in the event of briefly occurring peaks in the DC output voltage, provided that the first voltage threshold is not exceeded. Dynamic loads can thus also be supplied by the DC output voltage. The mean value threshold is preferably lower than the first voltage threshold.

It is particularly advantageous if power switches of the voltage converter are deactivated, for example by directly intervening in a gate control of the power switches, if the first voltage threshold is reached or exceeded and/or if the mean value threshold is reached or exceeded. It is also possible to switch off another part of the voltage converter or the entire voltage converter; what is important is that such a switch-off causes the DC output voltage to drop.

The second switch-off unit may be an integral component of the voltage converter, preferably an integral component of the first switch-off unit.

The first voltage threshold is preferably below a first voltage limit. It is provided that, after a switch-off of the at least part of the voltage converter, the DC output voltage is reduced within one microsecond or faster. After the first voltage threshold is reached or exceeded, a switch-off signal is triggered, whereby at least a part of the voltage converter is switched off. However, a switch-off delay can occur between the triggering of the signal and the actual switch-off. Due to the switch-off delay, the situation can arise that the DC output voltage rises above the voltage threshold to a certain extent even after the switch-off signal has been triggered, before it finally drops. Therefore, by setting the first voltage threshold below the voltage limit, it can be ensured that even if a switch-off delay occurs, the first voltage limit itself is not exceeded. For example, with a first voltage limit of 70.2 V, a first voltage threshold in the range of 60 to 70 V, preferably 60 to 65 V, may be provided.

The mean value threshold is preferably below a mean value limit (wherein the mean value limit is below the first voltage limit). It must be ensured that the mean value of the DC output voltage does not reach or exceed the mean value limit. For example, with a mean value limit of 60 V, a mean value threshold of 59.25 V may be provided.

Component tolerances, measurement errors, etc. may also be taken into account when setting the first voltage limit and/or the mean value threshold.

If the mean value of the DC output voltage reaches or exceeds the mean value threshold, at least a part of the voltage converter is switched off.

A second voltage threshold, lower than the first voltage threshold, may be provided. If a reaching or exceeding of the second voltage threshold by the DC output voltage is detected at a first time point, then, if the second voltage threshold is reached or exceeded by the DC output voltage at a second time point after an interval has elapsed from the first time point, it is concluded that the mean value threshold is reached or exceeded by the mean value of the DC output voltage.

The second switch-off unit can be configured to detect a first time point of reaching or exceeding a second voltage threshold, lower than the first voltage threshold, by the DC output voltage and, at a second time point after a predetermined interval has elapsed from the first time point, to check whether the second voltage threshold is reached or exceeded by the DC output voltage and, if the second voltage threshold is reached or exceeded both at the first time point and at the second time point, to conclude that the mean value of the DC output voltage reaches or exceeds the mean value threshold.

Discrete sampling time points at which the DC output voltage is sampled discretely in time and measured discretely in time by a voltage measurement unit, which is, for example, provided in or on the voltage converter, can be used as the first and second time points. For this purpose, however, it is also possible to use separate time points, which lie apart from already given sampling time points at which the DC output voltage is measured specifically for the comparison with the second voltage threshold.

The use of discrete sampling time points of the DC output voltage as first and second time points is moreover particularly advantageous if the DC output voltage is already available sampled discretely in time with a base sampling rate, for example due to a measurement by a voltage measurement unit mentioned above. This base sampling rate for underlying measurement of the DC output voltage can, for example, be in the range of 100 kHz or in the MHz range, wherein the first and second sampling time points preferably do not represent adjacent base sampling time points set by the base sampling rate, but are, for example, 0.01 to 100 ms apart, or preferably 0.1 to 100 ms apart, or particularly preferably 1 to 100 ms apart. Preferably, the distance between the first sampling time point and the second sampling time point is fixed.

Independently of any sampling, the first and second time points may also be 0.01 to 100 ms apart, or preferably 0.1 to 100 ms apart, or particularly preferably 1 to 100 ms apart. Preferably, the distance between the first time point and the second time point is fixed.

In this sense, the second switch-off unit can be configured to conclude whether a mean value, preferably a root mean square value, of the DC output voltage reaches or exceeds a mean value threshold, wherein the mean value threshold is lower than the first voltage threshold, and, upon concluding that the mean value threshold is reached or exceeded, to effect a switch-off of at least a part of the voltage converter in order to reduce the DC output voltage.

Concluding, from the second voltage threshold being reached or exceeded both at the first time point and at the second time, that the mean value threshold is reached or exceeded by the mean value represents a sufficient approximation in practice. Moreover, in many practical cases, comparing the DC output voltage to a second voltage threshold at a first time point and at a second time point can represent a more conservative switch-off criterion than the presented comparison of a mean value to a mean value threshold. This is particularly the case if the first time point and the second time point are, for example, no further apart than 100 ms.

Another aspect that can contribute to realizing a reliable and conservative criterion for a switch-off by comparing the DC output voltage to a second voltage threshold at a first time point and at a second time point is the magnitude of the second voltage threshold. If the second voltage threshold is set sufficiently low below the mean value threshold, with a suitable selection of the distance between the first time point and the second time point, it can be assumed in practice that concluding, from the second voltage threshold being reached or exceeded both at the first time point and at the second time, that the mean value threshold is reached or exceeded by the mean value does not lead to any erroneous non-switch-offs. On the contrary, switch-off thus sometimes also takes place in cases in which the mean value does not actually reach or exceed the mean value threshold.

An example of a sufficiently low selection of the second voltage threshold is the selection of 59.25 V for the second voltage threshold with a mean value threshold of 60 V, but 58 V may preferably also be selected for the second voltage threshold in this case, and most preferably also 57 V. In principle, the artisan in the field of safety technology knows how to best select the voltage thresholds and the time points for comparing them to the DC output voltage in a particular situation.

If the second voltage threshold is reached or exceeded, the interval starts at the first time point and ends at the second time point. This is a particularly cost-effective option for monitoring the mean value of the DC output voltage. Since, after the second voltage threshold has been reached or exceeded at the first time point, a check is made again at a second time point whether the second voltage threshold is reached or exceeded, and a switch-off only takes place if it is reached or exceeded again, it can be ensured that a switch-off does not take place immediately if the second voltage threshold is reached or exceeded at the first time point for a short time, for example due to a dynamic load change. The switch-off only takes place if the second voltage threshold is reached or exceeded even after the interval (i.e., at the second time point) has elapsed. However, if at any time point, the first voltage threshold is reached or exceeded, a switch-off always takes place.

It is also possible to check only at the first time point whether the second voltage threshold is reached or exceeded and at the second time point, after the predetermined interval has elapsed, whether another voltage threshold different from the second voltage threshold is reached or exceeded. Preferably, however, both at the start of the interval (i.e., at the first time point) and at the end of the interval (i.e., at the second time point), a check is made whether the second voltage threshold is reached or exceeded.

If, after the predetermined interval has elapsed, a check is made whether another voltage threshold different from the second voltage threshold is reached or exceeded, the second switch-off unit can be configured to detect a first time point of the reaching or exceeding of a second voltage threshold, lower than the first voltage threshold, by the DC output voltage and, at a second time point after a predetermined interval has elapsed from the first time point, to check whether the DC output voltage reaches or exceeds a third voltage threshold lower than the second voltage threshold and, if the second voltage threshold is reached or exceeded both at the first time point and at the second time point, to conclude that the mean value of the DC output voltage reaches or exceeds the mean value threshold.

With a mean value threshold of 60 V, the second voltage threshold can be selected to be 59.25 V and the third voltage threshold can be selected to be 58.25 V, or the second voltage threshold can be selected to be 58 V and the third voltage threshold can be selected to be 57 V, or the second voltage threshold can be selected to be 57 V and the third voltage threshold can be selected to be 55 V. In principle, however, the artisan in the field of safety technology knows how best to select the voltage thresholds and the time points for a comparison to the DC output voltage in a particular situation.

Of course, after the end of an interval, an additional interval can be provided with a first and a second time point, wherein, analogously, a check whether the second voltage source is reached or exceeded can take place in order to conclude that the mean value of the DC output voltage reaches or exceeds the mean value threshold.

Preferably, the mean value of the DC output voltage is calculated continuously. Accordingly, the second switch-off unit can be configured to continuously form a mean value of the DC output voltage and check whether the mean value of the DC output voltage reaches or exceeds a predetermined mean value threshold. The continuous calculation can take place in addition to or instead of checking whether the second voltage threshold is reached or exceeded at the first and second time points. Preferably, the mean value is calculated continuously over a predetermined mean value interval.

If a voltage measurement unit of the voltage converter outputs an incorrect voltage value for the DC output voltage, e.g., a voltage measurement value of 0 V, this leads to an increase in the DC output voltage (wherein an incorrect voltage measurement value, e.g., 0 V, continues to be displayed), whereby the DC output voltage consequently reaches or exceeds the first output threshold and/or the mean value of the DC output voltage reaches or exceeds the mean value threshold. If, however, the first and/or second switch-off unit also use the (incorrect) voltage measurement values of the voltage measurement unit associated with the voltage converter to determine the DC output voltage and/or the mean value of the DC output voltage, such reaching or exceeding is not detected by the first and/or second switch-off unit. However, an implausible voltage value can be detected by a plausibility check of the obtained voltage measurement values of the DC output voltage. However, if, for example, due to a defect in the voltage measurement unit of the voltage converter, such as a partial break of a resistor, voltage measurement values are falsified in such a manner that incorrect but plausible DC output voltages (i.e., DC output voltages that are in principle possible) occur, such incorrect voltage measurement value can of course not be detected by a plausibility check.

Preferably, therefore, a first voltage measurement unit, associated with the first switch-off unit and independent of a voltage measurement unit, associated with the voltage converter, for determining the DC output voltage, is provided for determining the DC output voltage and/or a second voltage measurement unit, associated with the second switch-off unit and independent of a voltage measurement unit, associated with the voltage converter, for determining the DC output voltage is provided for determining the DC output voltage. This prevents an impermissible voltage measurement value of the DC output voltage from being generated for the first and/or second voltage measurement unit if a single fault occurs in the voltage measurement unit of the voltage converter. Of course, it is particularly advantageous if the first and second switch-off units are not only independent of the voltage converter but also independent of one another, and if for example each have an independent voltage measurement unit. The entire first and/or second switch-off unit may also be independent of the voltage converter, wherein "independent" of course refers to checking whether the voltage thresholds and mean value thresholds are reached or exceeded; upon switching off the at least part of the voltage converter, it is of course necessary to intervene in a suitable manner in the operation of the voltage converter in order to reduce the DC output voltage.

Preferably, the first and/or second switch-off unit is configured to be double-fault proof in each case. Thus, a first circuit part and an additional circuit part, which is independent of the first circuit part, can respectively be provided. The circuit parts being simultaneously influenced by a single fault can thus be ruled out. For example, first and additional circuit parts may be designed redundantly.

Preferably, the voltage converter is designed in such a manner that an extra-low voltage up to a voltage limit of 60 V is output as the DC output voltage.

Preferably, the voltage converter is a rectifier for converting an AC input voltage into the DC output voltage or a DC-DC converter for converting a DC input voltage into the DC output voltage.

Furthermore, a long-stator linear motor or planar motor, which comprises a number of actuators and a voltage converter according to the invention for supplying voltage to the number of actuators by the DC output voltage, may be provided.

Figure 1B:
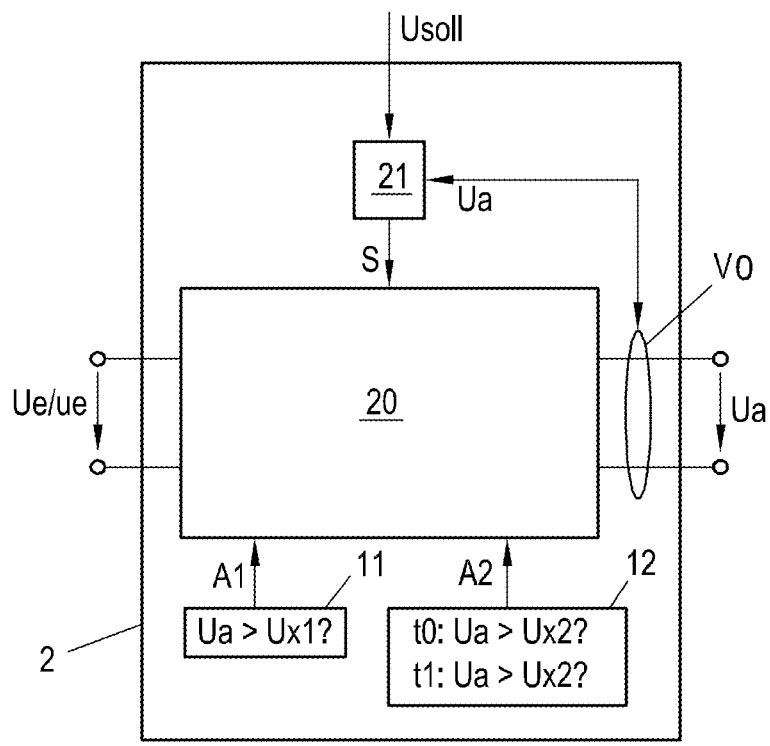
Figure 2:
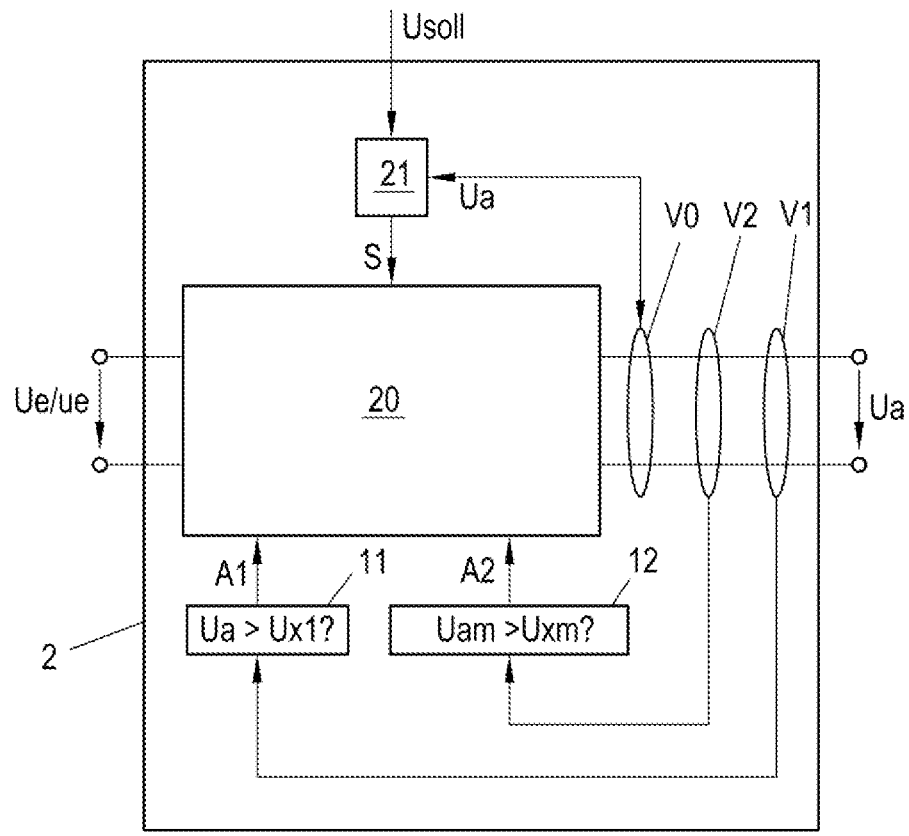
Figure 3A:
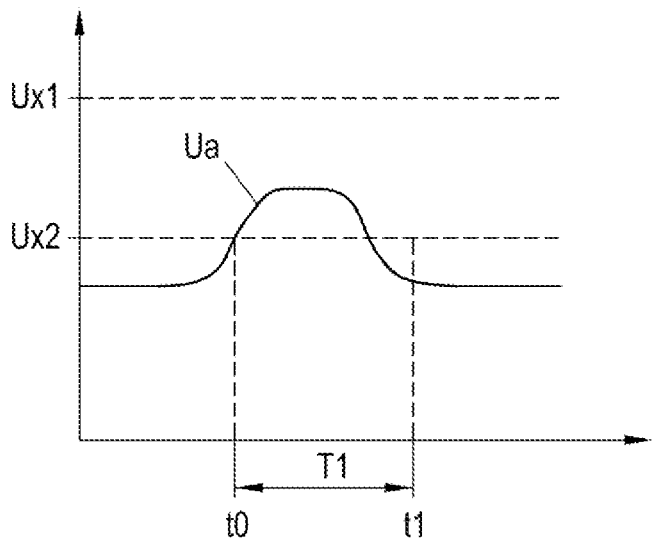
Figure 3B:
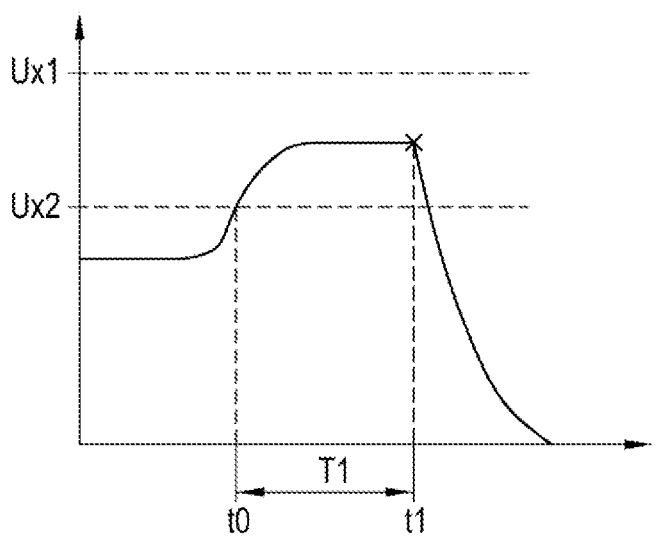
Figure 4:
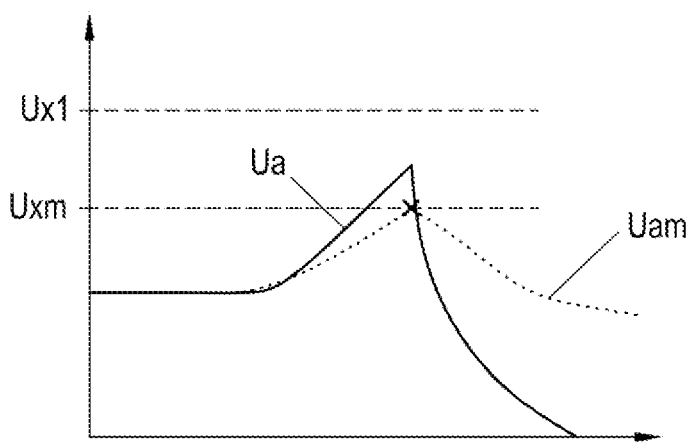

In the following, the present invention is described in greater detail with reference to FIGS. 1 to 4, which, by way of example, show advantageous embodiments of the invention in a schematic and non-limiting manner. The following are shown:

FIGS. 1a and 1b each show a voltage converter having a first and a second switch-off unit, FIG. 2 independent voltage measurement units of a first and a second switch-off unit, FIG. 3a an exceeding of the second voltage threshold at a first time point, FIG. 3b an exceeding of the second voltage threshold at a first and a second time point, FIG. 4 an exceeding of a mean value threshold by a mean value of the DC output voltage.

FIG. 1a shows a voltage converter 2, which outputs a DC output voltage Ua at an output. Furthermore, a voltage measurement unit V0, which determines the DC output voltage Ua at the output of the voltage converter 2, is provided. The voltage converter 2 comprises a voltage controller 21, which controls the DC output voltage Ua according to a predetermined target voltage Usoll. For this purpose, the voltage controller is supplied with the voltage value of the DC output voltage Ua by the voltage measurement unit V0 of the voltage converter 2. The voltage value of the DC output voltage Ua can be measured continuously in time or can be sampled discretely in time. The voltage controller 21 generates control signals S, which are fed to a power unit 20 of the voltage controller 21 in order to control the DC output voltage Ua according to the target voltage Usoll. As voltage converter 2, a rectifier, which converts an AC input voltage ue applied to an input into the DC output voltage Ua, can be provided or a DC-DC converter, which converts a DC input voltage Ue applied to an input into the DC output voltage Ua, can be provided. The AC input voltage ue may also first be converted into an intermediate DC voltage by the voltage converter 2, wherein the intermediate DC voltage is converted into the DC output voltage Ua by an additional stage of the voltage converter 2 or also by a separately provided DC-DC converter.

In order to determine the DC output voltage Ua, the voltage measurement unit V0 can sample the DC output voltage Ua discretely in time at a base sampling rate at base sampling time points, wherein the base sampling rate can preferably be in the range of 100 kHz.

The power unit 20 typically comprises a number of power switches, which are actuated in a manner corresponding to the control signals S, Since the operation of voltage converters 2 is generally known, it will not be discussed in detail here.

A number of actuators can be connected to the output of the voltage converter 2, wherein the number of actuators is supplied with the DC output voltage Ua. The voltage converter 2 can, for example, supply actuators of a long-stator linear motor or planar motor with the DC output voltage.

The voltage converter 2 comprises a first switch-off unit 11, which is configured to effect a switch-off of at least a part of the voltage converter 2 if the DC output voltage Ua reaches or exceeds a first voltage threshold Ux1, in order to reduce the DC output voltage Ua. This ensures that the DC output voltage Ua does not reach or exceed the first voltage threshold Ux1 or does so only for a short time.

Furthermore, the voltage converter 2 comprises a second switch-off unit 12, which is configured to check whether a mean value Uam of the DC output voltage Ua reaches or exceeds a mean value threshold Uxm and, if the mean value threshold Uxa is reached or exceeded, to effect a switch-off of at least a part of the voltage converter 2 in order to reduce the DC output voltage Ua. The second switch-off unit 12 is shown here as an integral component of the voltage converter 2 but can also be provided separately.

The first and/or the second switch-off unit 11, 12 may comprise microprocessor-based hardware, for example, a computer or a digital signal processor (DSP), on which corresponding software is executed to perform the respective function. The first and/or second switch-off units 11, 12 may also comprise an integrated circuit, such as an application-specific integrated circuit (ASIC) or a field-programmable gate array (FPGA), also with a microprocessor. However, the first and/or second switch-off units 11, 12 may also comprise an analog circuit or an analog computer. Mixed forms are conceivable as well. Likewise, it is possible that different functions are implemented on the same hardware.

A possible switch-off of at least a part of the voltage converter 2, both by the first switch-off unit 11 and by the second switch-off unit 12, takes place by switch-off signals A1, A2 acting on the power unit 20. For example, power switches of the power unit 20 can be deactivated by corresponding switch-off signals A1, A2.

Preferably, a first voltage measurement unit V1 which is associated with the first switch-off unit 11 and which is independent of the voltage measurement unit V0 associated with the voltage converter 2 is provided. Thus, it is possible for the first switch-off unit 11 to determine the value of the DC output voltage Ua even if the voltage measurement unit V0 associated with the voltage converter 2 determines an incorrect value of the DC output voltage Ua.

Preferably, a second voltage measurement unit V2 which is associated with the second switch-off unit 12 and which is independent of the voltage measurement unit V0 associated with the voltage converter 2 is provided. Thus, it is possible for the second switch-off unit 12 to determine the value of the DC output voltage Ua even if the voltage measurement unit V0 associated with the voltage converter 2 determines an incorrect value of the DC output voltage Ua.

If a first and a second voltage measurement unit V1, V2 are provided, which are independent of a voltage measurement unit V0 associated with the voltage converter 2, it is particularly advantageous if the first and second voltage measurement units V1, V2 are also independent of one another, as shown in FIG. 2. Alternatively, only a first voltage measurement unit V1, which makes the value of the DC output voltage Ua available to both the first switch-off unit 11 and the second switch-off unit 12, may also be provided.

Preferably, a check is made whether, at a first time point t0, a reaching or exceeding of a second voltage threshold Ux2, lower than the first voltage threshold Ux1, by the DC output voltage Ua is detected. If the DC output voltage Ua also reaches or exceeds the second voltage threshold Ux2 at a second time point t1 after a predetermined interval T1 has elapsed from the first time point t0, as schematically indicated in FIG. 1b, it is concluded that the mean value Uam of the output voltage Ua is exceeded. Preferably, the second voltage threshold Ux2 corresponds to the mean value threshold Uxm.

This means that if the second voltage threshold Ux2 is exceeded for a short time (for example, due to dynamic load changes and a corresponding short-time increase in the DC output voltage Us) at the first time point t0 (at the start of interval T1), there is no switch-off, provided that the first voltage threshold Ux1 is not exceeded.

FIG. 3a shows an exemplary DC output voltage Ua, wherein the DC output voltage Us reaches and exceeds the second voltage threshold Ux2 at the first time point t0 but does not (or no longer) reach or exceed the second voltage threshold Ux2 at the second time point t1, after the interval T1 has elapsed. Thus, there is no switch-off of at a least part of the voltage converter 2. Here as well, the DC output voltage Ua never reaches or exceeds the first voltage threshold Ux1, which means that there is no switch-off in this case.

If, after the interval T1 has elapsed, the DC output voltage Ua is greater than/equal to the second voltage threshold Ux2 at the second time point t1, the at least part of the voltage converter 2 is switched off for this reason. Such an exemplary curve of the DC output voltage Ua is shown in FIG. 3b.

In order to select the first time point t0 and the second time point t1, sampling time points at which the DC output voltage is sampled discretely in time and measured discretely in time, for example by the voltage measurement unit V0, can be used in an advantageous manner. For the selection of the sampling time points, in turn, the base sampling time points that are set by the base sampling rate of the voltage measurement unit V0 may be used. The first time point t0 and the second time point t1 are to be separated by a time interval, wherein such time interval has, for example, a length of 0.01 to 100 ms, or preferably a length of 0.1 to 100 ms, or particularly preferably a length of 1 to 100 ms. Preferably, the distance between the first time point t0 and the second time point t1 is fixed.

Although FIG. 3a and FIG. 3b each show the use of the same second threshold Ux2 at the first time point t0 and at the second time point t1, alternatively the second threshold Ux2 can be used at the first time point t0 and a third threshold Ux3 instead of the second threshold Ux2 can be used at the time point t1 (not shown). In a preferred manner, the third threshold Ux3 is in this case below the second threshold Ux2. However, it is also conceivable to select a third threshold Ux3 above the second threshold Ux2.

The mean value Uam of the DC output voltage Ua can be continuously calculated in a calculation unit, which is preferably an integral component of the second switch-off unit, and a reaching or exceeding of a mean value threshold Uxm can be checked. Such a curve of the mean value Uam is shown in FIG. 4, wherein the DC output voltage Ua is also drawn in dotted lines. The mean value Uam reaches the mean value threshold Uxm at the point marked with x, which causes the at least part of the voltage converter 2 to be switched off, resulting in a reduction of the DC output voltage Ua, as can be seen from the associated flattening curve. If the determined mean value Uam were lower than the mean value threshold Uxm, the at least part of the voltage converter 2 would not be switched off (unless the DC output voltage Ua reaches or exceeds the first voltage threshold Ux1).

In the following, a possible determination of a first voltage limit and a mean value limit is described as an example.

If, for the voltage converter 2, it is provided that the DC output voltage Ua is in the range of extra-low voltage and if it furthermore has an overvoltage protection, the voltage converter 2 is called a PELV (protective extra-low voltage) system. A PELV system must comply with the standards DIN EN 61800-5-1 VDE 0160-105-1:2018-09 and DIN EN 60204-1 VDE 0113-1:2019-06. In point 3.21, standard EN61800-5-1 requires an electrical circuit with the following characteristics:

- The voltage does not permanently reach or exceed the ELV both in a single fault condition and in normal conditions;
- Protective separation from circuits other than PELV or SELV;
- Grounding devices for the PELV circuit, its touchable conductive parts, or both.

Section 4.3.1.1 "Use of the applicable voltage classes (DVC)" states the following: Protective measures against electric shock depend on the classification of the circuits according to applicable voltages in Table 3, which relates the limits of the working voltage within the circuit to the DVC. The DVC thus indicates the minimum degree of protection required for the circuit.

The corresponding Table 3 is presented in the following Section 4.3.1.2 "Limits of the DVC" and shows a DC output voltage with a maximum mean value of 60V for the voltage class DVC A.

According to Section 4.3.1.4.3, the following conditions are defined with reference to Table 3: The arithmetic mean value of the DC output voltage must not exceed the mean upper limit of 60 V, and the periodic peak value must not exceed 1.17 times the mean upper limit, i.e., 60 V*1.17=70.2 V.

In order to achieve maximum efficiency of the voltage converter 2, it is desired to keep the DC output voltage Ua as high as possible. Thus, the periodic peak value, which represents a transient maximum value, is selected as the first voltage limit, i.e., at 70.2 V. A first voltage threshold Ux1 is set, the value of which is advantageously set below the first voltage limit, for example 63 V. If the DC output voltage Ua reaches or exceeds this first voltage threshold Ux1, at least a part of the voltage converter 2 is immediately switched off in order to reduce the DC output voltage Ua.

Since a maximum mean value (RMS) of 60 V is also specified for the DC output voltage Ua for classification as an extra-low voltage system (DVCA), the second voltage limit for the DC output voltage Ua is selected to correspond to the maximum mean value, i.e., at 60 V. The value of the mean value threshold Uam and/or the second voltage threshold Ux2 is preferably set below the second voltage limit, e.g., at 59.25 V. However, the second voltage threshold Ux2 may also correspond to the second voltage limit.

A mean value Uam of the DC output voltage Ua is formed over a predetermined mean value interval tm and a check is made whether the mean value Uam is above a mean value threshold Uxm. If this is the case, the additional condition Z is fulfilled and a switch-off takes place.

If the DC output voltage Ua does not reach or exceed the first voltage threshold Ux1 and the mean value of the DC output voltage Ua does not reach or exceed the mean value threshold Ux2, the voltage converter 2 falls into the DVCA class.

As described above, the mean value Uam can be continuously calculated and compared to the mean value threshold Uxm and/or a conclusion can be drawn that the mean value Uam of the DC output voltage Ua reaches or exceeds said mean value threshold Uxm if the DC output voltage Ua reaches or exceeds a second voltage threshold Ua2 (which preferably corresponds to the mean value threshold Uxm) at a first time point t0 and after an interval T1 at a second time point t1.

The invention claimed is:

1. A voltage converter for converting an input voltage into a DC output voltage output at an output of the voltage converter, comprising:
   a first switch-off unit, which is configured to effect a switch-off of at least a part of the voltage converter if the DC output voltage reaches or exceeds a first voltage threshold in order to reduce the DC output voltage,
   a second switch-off unit, which is configured:
      to continuously form a mean value of the DC output voltage output at the output of the voltage converter,
      to check whether the mean value of the DC output voltage reaches or exceeds a mean value threshold, and
      to effect a switch-off of at least a part of the voltage converter when the mean value threshold is reached or exceeded in order to reduce the DC output voltage,
   wherein the second switch-off unit is further configured:
      to detect a first time point of reaching or exceeding a second voltage threshold, lower than the first voltage threshold, by the DC output voltage and, at a second time point after a predetermined interval has elapsed from the first time point,
      to check whether the second voltage threshold is reached or exceeded by the DC output voltage, and
      to conclude, when the second voltage threshold is reached or exceeded both at the first time point and at the second time point, that the mean value of the DC output voltage reaches or exceeds the mean value threshold,
   wherein the first and second time points are 0.01 to 100 ms apart.

2. The voltage converter according to claim 1, wherein the second switch-off unit is an integral component of the voltage converter.

3. The voltage converter according to claim 1, wherein the second switch-off unit is further configured to continuously calculate the mean value of the DC output voltage and to compare the continuously calculated mean value of the DC output voltage to the mean value threshold.

4. The voltage converter according to claim 1, further comprising a voltage measurement unit, which is associated with the first switch-off unit and independent of a voltage measurement unit that is associated with the voltage converter for determining the DC output voltage, for determining the DC output voltage.

5. The voltage converter according to claim 1, wherein a voltage measurement unit, which is associated with the second switch-off unit and independent of a voltage measurement unit that is associated with the voltage converter for determining the DC output voltage, for determining the DC output voltage.

6. The voltage converter according to claim 1, wherein the voltage converter is a rectifier for converting an AC input voltage into the DC output voltage.

7. The voltage converter according to claim 1, wherein the voltage converter is a DC-DC converter for converting a DC input voltage into the DC output voltage.

8. A long-stator linear motor comprising:
a number of actuators and
a voltage converter according to claim 1 configured for supplying the DC output voltage to the number of actuators.

9. A planar motor comprising:
a number of actuators and
a voltage converter according to claim 1 configured for supplying the DC output voltage to the number of actuators.

10. The voltage converter according to claim 1, wherein the mean value continuously formed in the second switch-off unit comprises a root mean square value,
whereby the second switch-off unit is configured:
to continuously form a root mean square value of the DC output voltage output at the output of the voltage converter,
to check whether the root mean square value of the DC output voltage reaches or exceeds a root mean square value threshold, and
to effect a switch-off of the at least a part of the voltage converter when the root mean square value threshold is reached or exceeded in order to reduce the DC output voltage.

11. The voltage converter according to claim 1, wherein the second switch-off unit is an integral component of the first switch-off unit.

12. A method for monitoring a DC output voltage output at an output of a voltage converter, wherein the voltage converter converts an input voltage into the DC output voltage output at the output of the voltage converter, the method comprising:
in a first switch-off unit, providing a first voltage threshold and switching off at least a part of the voltage converter when the first voltage threshold is reached or exceeded by the DC output voltage in order to reduce the DC output voltage,
in a second switch-off unit, continuously forming a mean value of the DC output voltage output at the output of the voltage converter and checking whether the mean value of the DC output voltage reaches or exceeds a mean value threshold,
switching off at least a part of the voltage converter when the mean value threshold is reached or exceeded in order to reduce the DC output voltage,
providing a second voltage threshold, lower than the first voltage threshold,
detecting a first time point of reaching or exceeding the second voltage threshold by the DC output voltage, and
concluding that the mean value of the DC output voltage reaches or exceeds the mean value threshold when the DC output voltage reaches or exceeds the second voltage threshold at a second time point after an interval has elapsed from the first time point,
wherein the first and second time points are 0.01 to 100 ms apart.

13. The method according to claim 12, further comprising deactivating power switches of the voltage converter at least one of when the first voltage threshold is reached or exceeded by the DC output voltage or when the mean value threshold is reached or exceeded by the mean value.

14. The method according to claim 13, wherein the second voltage threshold corresponds to the mean value threshold.

15. The method according to claim 12, wherein the mean value of the DC output voltage is calculated continuously.

16. The method according to claim 12, wherein the mean value continuously formed in the second switch-off unit comprises a root mean square value,
whereby the method includes, in the second switch-off unit, continuously forming a root mean square value of the DC output voltage output at the output of the voltage converter and checking whether the root mean square value of the DC output voltage reaches or exceeds a root mean square value threshold, and
switching off at least a part of the voltage converter when the root mean square value threshold is reached or exceeded in order to reduce the DC output voltage.

\* \* \* \* \*